United States Patent [19]

Balster et al.

[11] Patent Number: 5,078,928
[45] Date of Patent: Jan. 7, 1992

[54] COATING PROCESS FOR MANUFACTURING ENLARGED SMOOTH TEETH ENDS ON A COMB

[75] Inventors: Melvin E. Balster, Minnetonka; Michael J. Fleckenstein, Rosemount, both of Minn.

[73] Assignee: Mebco Industries, Inc., Shakopee, Minn.

[21] Appl. No.: 512,936

[22] Filed: Apr. 24, 1990

Related U.S. Application Data

[63] Continuation-in-part of Ser. No. 59,224, May 21, 1987, abandoned, which is a continuation of Ser. No. 734,857, May 15, 1985, abandoned.

[51] Int. Cl.⁵ .................... B05D 5/00; B29D 21/00
[52] U.S. Cl. ......................... 264/37; 118/57; 118/501; 132/159; 264/80; 264/129; 264/243; 425/805; 427/223; 427/284; 427/346; 427/348; 427/430.1
[58] Field of Search ............. 264/80, 37, 243, 129; 132/219, 159; 427/430.1, 37, 223, 256, 265, 284, 346, 348; 118/501, 57; 425/805

[56] References Cited

U.S. PATENT DOCUMENTS

| | | | |
|---|---|---|---|
| 27,837 | 12/1913 | Traun | 132/159 |
| 1,092,883 | 4/1914 | Wieland | 425/805 |
| 1,830,662 | 11/1931 | Kail | 427/265 |
| 2,338,735 | 1/1944 | Person | 425/805 |
| 2,451,960 | 10/1948 | Krajci et al. | 427/348 |
| 2,640,584 | 6/1953 | Robb et al. | 118/57 |
| 2,984,248 | 5/1961 | Sidelman | 132/158 |
| 3,111,418 | 11/1963 | Gilbert et al. | 427/37 |
| 3,165,564 | 1/1965 | Howle et al. | 264/80 |
| 3,503,859 | 3/1970 | Goncarovs et al. | 493/326 |
| 3,810,599 | 5/1974 | Fornari | 425/805 |
| 3,962,509 | 6/1976 | Thomson | 427/372.2 |
| 4,422,986 | 12/1983 | Cole | 264/243 |

FOREIGN PATENT DOCUMENTS

| | | | |
|---|---|---|---|
| 1235622 | 5/1960 | France | 132/159 |
| 2054368 | 2/1961 | United Kingdom | 15/159 A |

Primary Examiner—Jan H. Silbaugh
Assistant Examiner—Brian J. Eastley
Attorney, Agent, or Firm—Merchant Gould Smith Edell Welter Schmidt

[57] ABSTRACT

A process for permanently attaching smooth finished globules of coating material to the ends of the teeth of molded plastic combs, picks, lifts and the like, including roughening or oxidizing the teeth ends to remove the gloss finish and form a more adherent surface; dipping the roughened teeth ends into a bath of liquid coating material to attach a globule of coating material to each tooth end and cover the sharp mold-parting line located thereat; and drying the globules attached to the teeth ends.

12 Claims, 5 Drawing Sheets

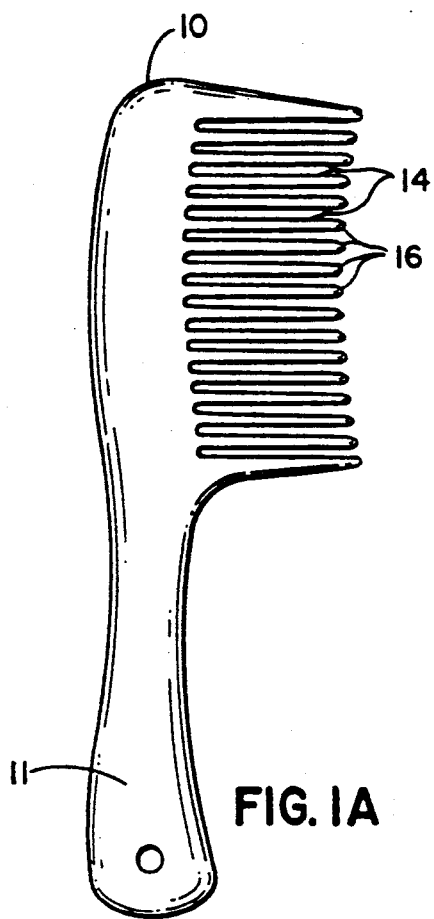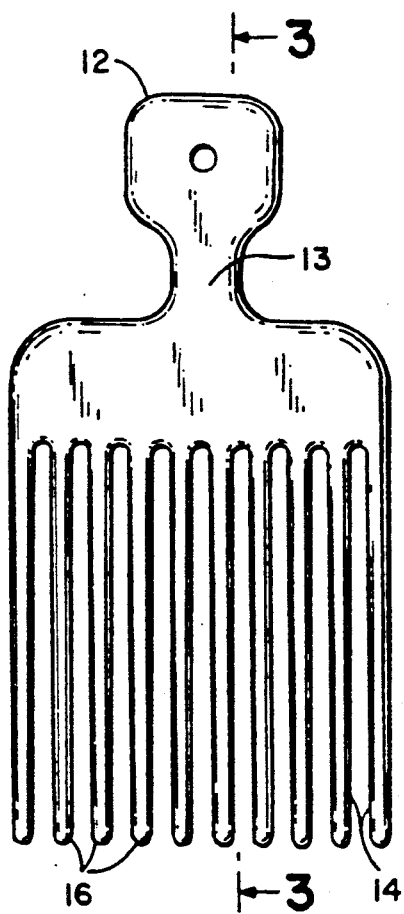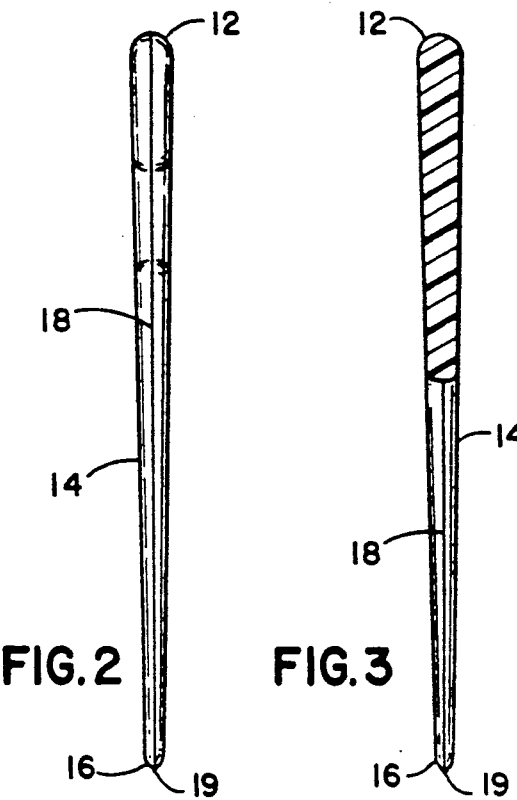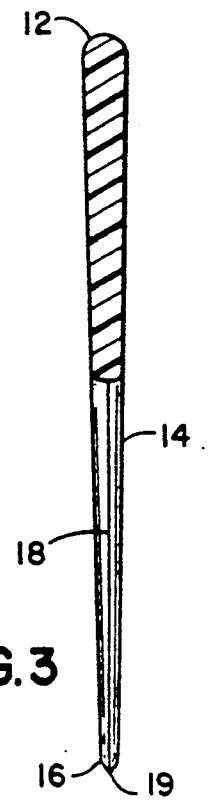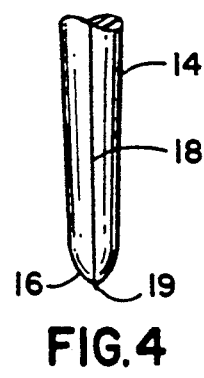

COATING PROCESS FOR MANUFACTURING ENLARGED SMOOTH TEETH ENDS ON A COMB

CROSS REFERENCE TO RELATED APPLICATIONS

This application is a Continuation In Part application based on copending prior application Ser. No. 07/059,224, filed on May 21, 1987, now abandoned, which is itself a continuation application based on then copending prior application Ser. No. 06/734,857, filed May 15, 1985, now abandoned.

TECHNICAL FIELD

The present invention relates generally to the manufacture of plastic hair combs, picks, lifts and the like. More particularly, this invention involves the manufacture of combs with enlarged smooth terminal teeth ends which avoid scratching the scalp and are thus easier and more comfortable to use.

BACKGROUND OF THE INVENTION

Combs are familiar items of personal grooming. Before the late 1940's, combs were generally handcut from bone, wood or rubber. These combs were expensive because of the manual labor involved in individually carving out the teeth and subsequently polishing the combs.

For some time now it has been common practice to produce combs by injection-molding. The generally flat elongated structural features of combs, picks, lifts and the like make them suitable for manufacturing by the injection-molding process. First, a metallic mold, typically comprised of two complementary female halves, is made for the desired articles to be cast. The mold halves are then joined together and injected with a plastic to form the article. After the plastic has hardened somewhat, the mold halves are parted and the article is removed. Such molds can be used repetitively to mass-produce articles inexpensively.

However, the injection-molding process has some drawbacks and is not satisfactory in all respects. For example, a small amount of flashing is left on each molded article forming a mold-parting line where the mold halves are joined together. For most injection-molded articles the mold-parting line poses little or no problem. However, in the case of combs, the mold-parting line runs around the entire periphery of the article, including the free terminal ends of the teeth. Small but sharp burrs or ridges are formed where the parting line passes over the ends of the teeth which can scratch the scalp and cause discomfort.

To avoid these drawbacks, it is therefore desirable to smooth or enlarge and smooth the teeth ends. Modifying the mold to provide larger teeth ends still leaves a mold-parting line. Smoothing the teeth ends involves additional manufacturing steps and thus expense.

Hairbrushes with bristles having enlarged terminal ends formed by some kind of coating technique, have been available heretofore. However, the prior techniques for manufacturing such hairbrushes are not suited for use with molded, one-piece combs of high production volume and low unit cost. Hairbrush bristles are not usually manufactured using the injection-molding process and thus have no parting line nor its accompanying burrs and ridges. Injection-molded combs do have the parting-line problem. Heretofore, there has not been available a cost-effective technique for manufacturing combs having smooth enlarged teeth ends of good quality, durable construction, and pleasing appearance.

A need has thus arisen for a new and improved technique for inexpensively manufacturing molded combs with these features.

SUMMARY OF THE INVENTION

The present invention involves a new and improved technique for manufacturing molded plastic combs having smooth, enlarged terminal teeth ends which overcomes the foregoing and other disadvantages associated with the prior art. In accordance with the invention, there is provided a process or method for permanently attaching smooth finished globules of liquid coating material, preferably catalyzed polyurethane enamel, to the ends of the teeth of injection-molded plastic combs, picks, lifts and the like. The method includes the steps of: providing an injection-molded plastic comb; roughening the teeth ends to remove the glossy finish and form a more adherent surface; dipping the roughened teeth ends into a bath of liquid coating material to attach a globule of coating material to each tooth end to cover the sharp mold-parting line located thereat; and drying the globules attached to the teeth ends.

This process of attaching a smooth finished globule to each individual tooth end advantageously eliminates the sharp mold-parting line burrs located at the teeth ends which can scratch the scalp and cause discomfort when combing hair.

BRIEF DESCRIPTION OF THE DRAWINGS

A better understanding of the invention can be had by reference to the following Detailed Description in conjunction with the accompanying Drawings, wherein:

FIGS. 1A and 1B are views of a comb and pick;

FIG. 2 is a side view of the pick of FIG. 1B;

FIG. 3 is a cross-sectional view of the pick along lines 3—3 of FIG. 1B;

FIG. 4 is an enlarged side view of a broken-away tooth of either a comb or pick;

DETAILED DESCRIPTION OF THE PREFERRED EMBODIMENT

Figure 5:
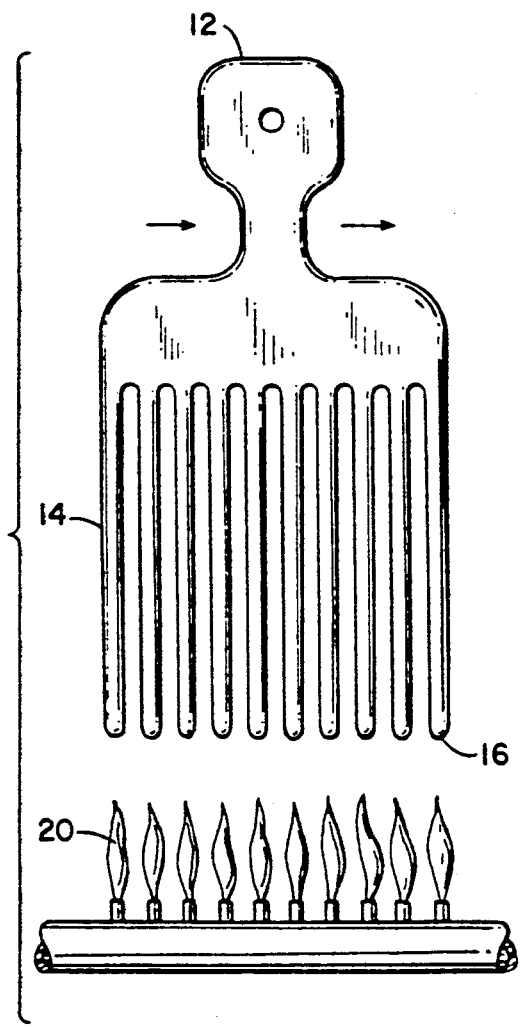
FIG. 5 is a front elevational view of the pick passing through an open flame.

Referring to the Drawings, wherein like numerals designate like or corresponding elements throughout the views, and particularly referring to FIGS. 1A and 1B, a hair comb 10 and pick or lift 12 may be seen. They are preferably injection-molded out of polypropylene plastic which forms a glossy finish on comb 10 and pick 12. However, it is believed that proprionate or acetate are among other suitable plastic materials that may be used. Comb 10 and pick 12 each have a row of parallel teeth 14 with free terminal teeth ends 16. The teeth 14 of comb 10 are secured to an offset handle 11, while the teeth of pick 12 are secured to an in-line handle 13. Comb 10 and pick 12 are each of molded one-piece construction. For illustrative purposes the pick 12 is discussed hereinafter although all elements and steps of the process are applicable to combs 10 or the like as well.

Referring specifically to FIGS. 2-4, a conventionally molded pick 12 has a mold-parting line 18 which runs around its entire periphery. At teeth ends 16, the mold-parting line 18 forms sharp burrs 19. Burrs 19 may scratch the scalp and cause discomfort when combing a person's hair. The present invention teaches a process to permanently cover the mold imperfections—sharp burrs 19 and eliminate the discomfort when combing a person's hair with injection-molded plastic combs, picks, lifts or the like.

As will be explained more fully hereinafter, the process includes the steps of roughening the teeth ends, dipping the roughened teeth ends into a bath of polyurethane enamel forming globules at the teeth ends, and drying the globules. A number of alternative methods of removing any excess enamel before drying are also disclosed.

After the injection-molded plastic comb 10 and pick or lift 12 have been provided, the next step involves roughening or oxidizing the terminal teeth ends to facilitate adherence by the liquid polyurethane enamel. This can be accomplished thermally, mechanically, or in any other suitable manner. For example, the teeth ends 16 may be passed through an electrostatic field or spark gap wherein an arc or corona discharge will pass a high voltage over the surface thereof to effectively roughen their surfaces. In the preferred embodiment, however, the terminal teeth ends 16 are roughened by passage through, or near, an open flame. Another method of oxidizing the tooth ends involves applying an acid bath to roughen and oxidize the comb tooth surface to increase enamel adhesion. Acetone, or other solvents, when applied to the surface also provide a more adherent surface without deforming the teeth ends.

Figure 6:
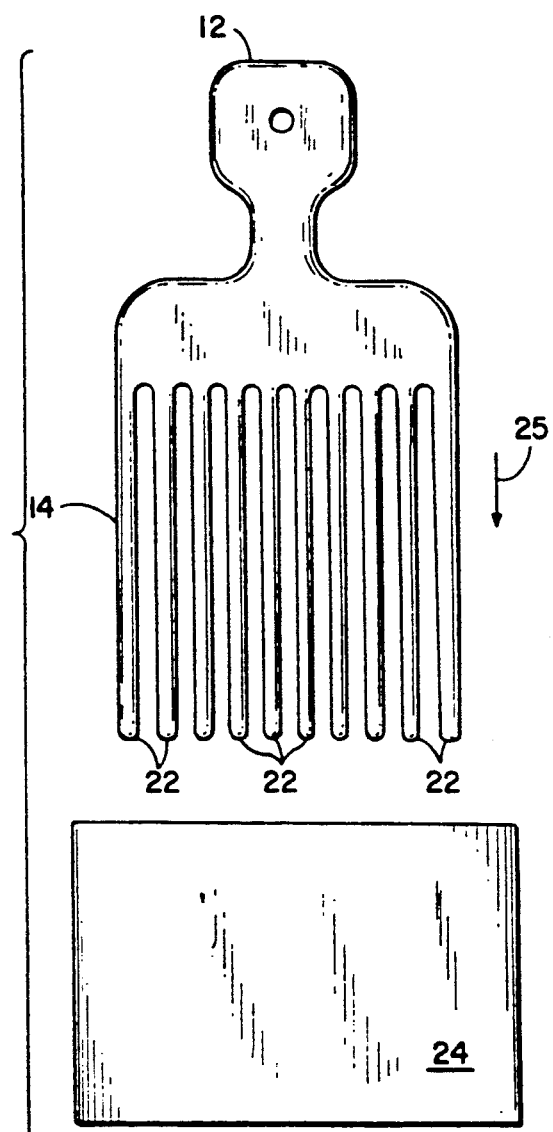
FIG. 6 is a front elevational view of the pick and a polyurethane enamel bath.
Figure 7:
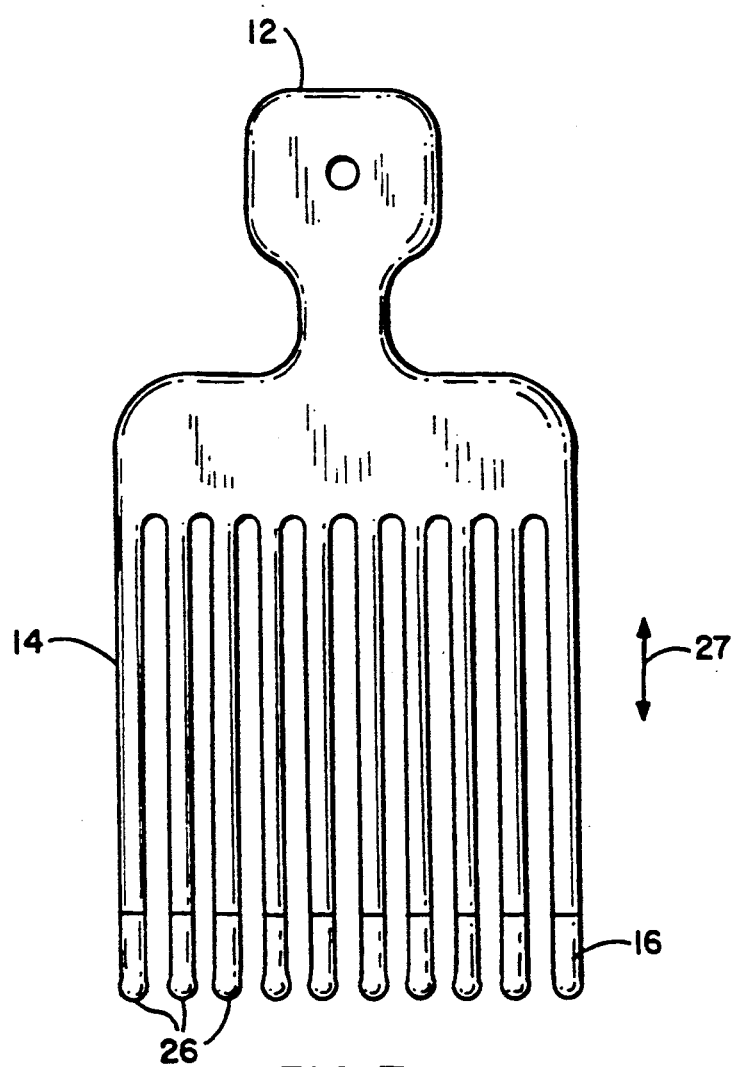
FIG. 7 is a front elevational view of the pick with globules attached to the teeth ends.
Figure 8:
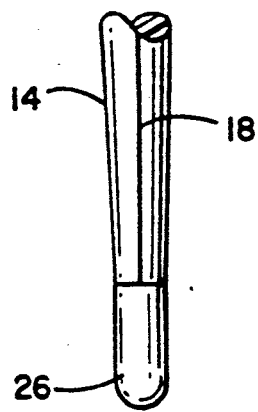
FIG. 8 is an enlarged broken-away side view of a tooth having a globule attached to its end.

Referring specifically to FIGS. 5-7, teeth ends 16 are passed through an open flame 20 to remove their glossy finish which is inherent in injection-molded plastics. This step favorably roughens the surface or flashes off a thin covering film, thereby opening pores in the surface for forming a surface suitable for permanent adherence of a coating material that will not readily peel away or fall off. The time for flaming the teeth ends is somewhat variable, depending upon the temperature of the flame and thickness of the teeth ends 16, but in no event should the time be long enough to deform the teeth ends or change the teeth shapes.

The roughened teeth ends 22 are then preferably dipped into a liquid bath of catalyzed polyurethane enamel 24, as indicated by arrow 25 in FIG. 6. It is desirable to use enamel 24 because it will form a tough durable finish. Enamel 24 preferably comprises polyurethane and isocyanate, such as the product sold under the trade name "Polane" manufactured by Sherwin Williams Company, Chemical Coating Division, of Chicago, Ill. The high-solids content of this particular formula of enamel 24 is preferable as it not only adheres very well but also retains its smooth rounded shape throughout the drying and curing process. It thus forms beads, spheres, or globules 26 effectively coating sharp burrs 19 at teeth ends 16 with a new glossy finish that will not scratch the human scalp. There may be other types of liquid coating material which will function to form the required beads provided the material has sufficient high-solids content.

In accordance with the preferred embodiment, the comb or hair pick 12 is then jolted or shaken vertically once or twice as indicated by double arrow 27 in FIG. 7 to release any excess enamel 24 and facilitate the formation by gravity of smooth globules 26 on the terminal teeth ends 16.

Figure 10:
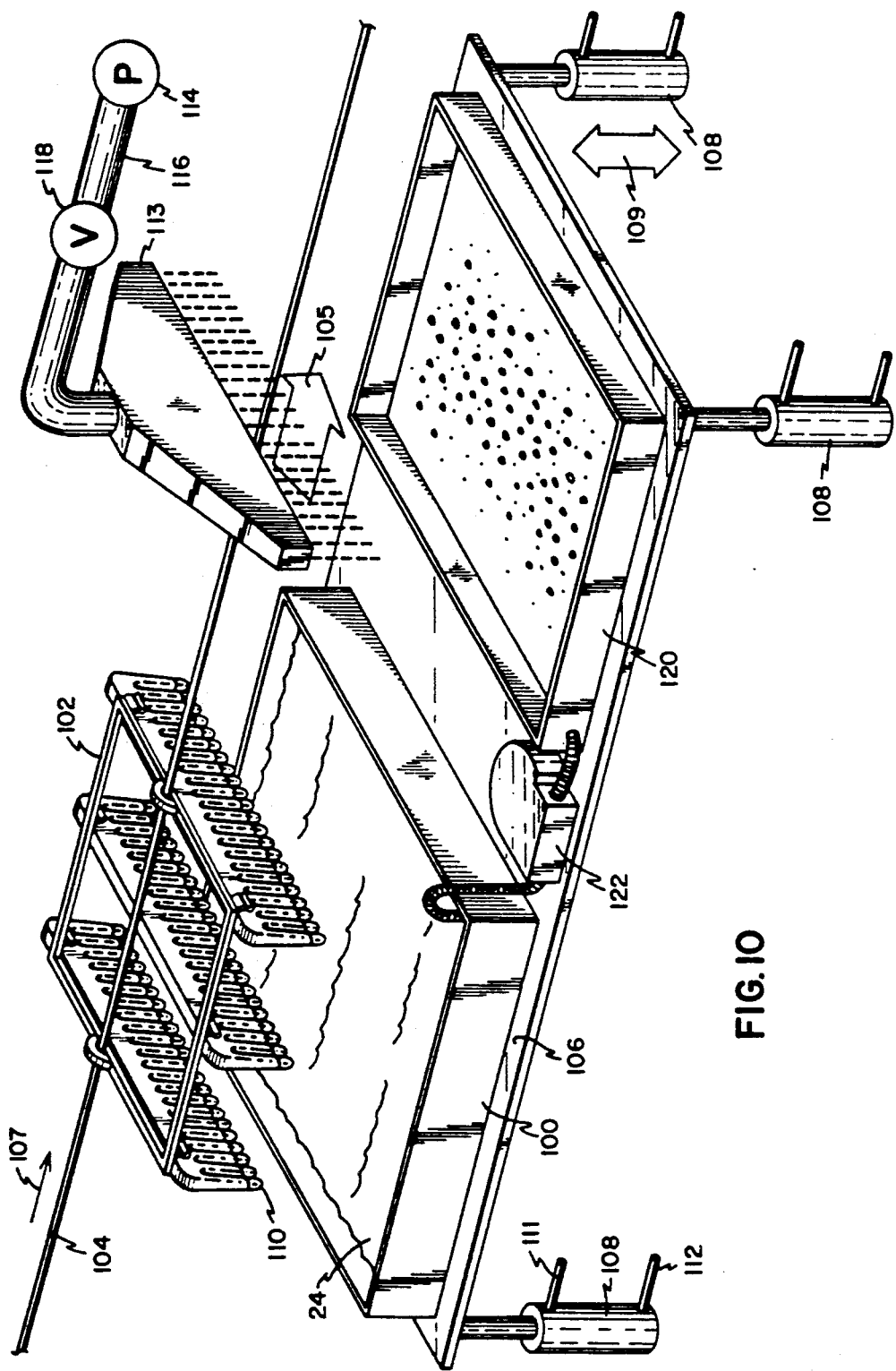
FIG. 10 is a perspective view of a comb dipping station showing a dipping bath and blower device for removal of excess enamel.
Figure 11:
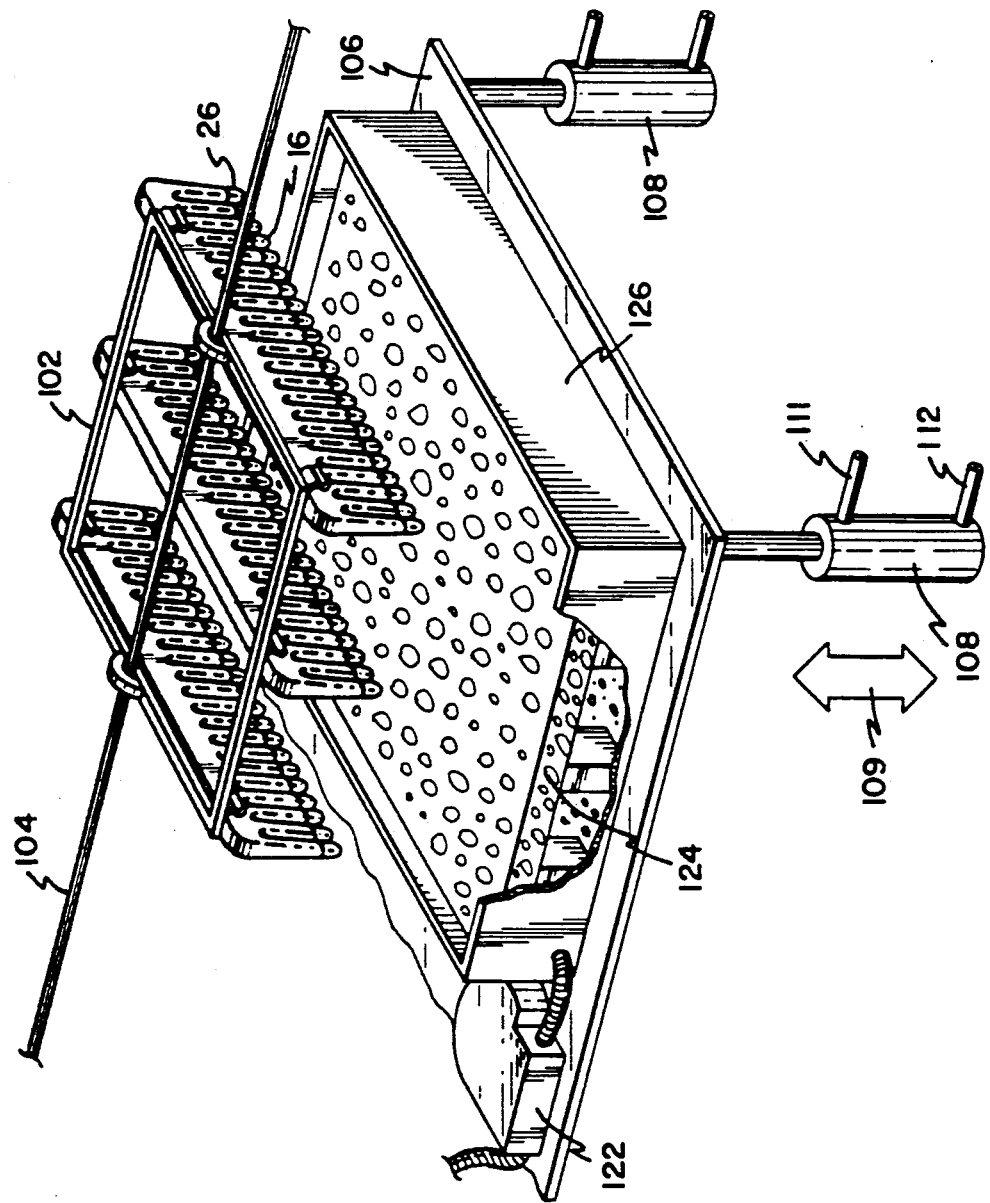
FIG. 11 is a partial perspective view of a comb dipping station showing an alternative method of removing any excess enamel with a blotting surface.

FIGS. 10-11 illustrate alternative embodiments. FIG. 10 demonstrates a bath of liquid coating contained in a vat or container 100. The combs are suspended in a carrier 102 which hangs from a line 104. The vat 100 is placed on an air table 106 which rises vertically upon the actuation of air cylinders 108. (See arrow 109) The air cylinders are connected to inlet and outlet hoses 111 and 112 respectively. These hoses are connected to suitable driving means such as air pumps or a source of pressurized air. The cylinders 108 are used to selectively raise and lower the table 106 as desired.

The line 104 moves forward as shown by arrow 107 and stops with the carrier and its combs above the vat 100. The air table 106 then rises upon the actuation of cylinders 108 to deposit a coating of liquid as shown by numeral 110. The table then returns to its lowered position and the line moves forward again in the direction of arrow 107.

In the embodiment shown in FIG. 10, the combs pass under air knife 113 which defuses high velocity air from an air compressor or other source of compressed air. The compressor is shown schematically at 114. The compressed air passes through a compressed air line 116 passed a valve 118 which selectively open the passage way to allow air to pass to air knife 113. The jet of air blows against the combs having just emerged from the vat 100 as they move along line 104 in the position shown by arrow 105. This jet of air releases any excess enamel 24 and facilitates the formation of smooth globules on the terminal teeth ends.

Excess paint accumulates in recovery vat 120 and is returned as needed by recovery pump 122 to vat 100. The combs may then proceed to a drying station.

In reference to FIG. 11, a further alternative embodiment is shown. A sponge bed 124 or other absorbent and porus material in relatively planar form is contained within a blotting vessel 126. The sponge bed 124 is installed on table 106 at a level which corresponds generally to the top of the enamel 24 in vat 100. The line 104 is staged or controlled to stop with a carrier 102 above the blotting surface. As the table 106 rises the blotting surface of the sponge bed draws excess enamel 24 from the teeth ends 16. Gravity then assists the formation of suitable globules 26 on the terminal teeth ends.

Figure 9:
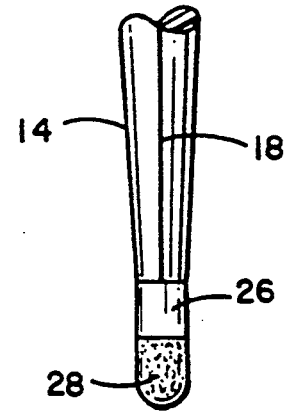
FIG. 9 is an enlarged broken-away side view of a tooth having a globule with a second coating of enamel.

Globules 26 attached to teeth ends 16 are then suitably dried at generally room temperature for approximately six to eight hours. The dried globules 26 may then be dipped again into the same or another bath of catalyzed polyurethane enamel 24 to further coat teeth ends 16 and burrs 19 with a smooth glossy finish with another coating of enamel 24 forming finished, two-coat globules 28 as shown in FIG. 9. The globules 26 are then again dried.

In this process the mold imperfections at the mold-parting line 18 forming burrs 19 at teeth ends 16, are permanently covered with the catalyzed polyurethane enamel 24, effectively covering the sharp burrs with smooth globules 26 and thereby eliminating the possibility of painful scalp scratching when combing one's hair with dipped pick 12 or comb 10.

From the foregoing, it will thus be apparent that the present invention comprises a new and improved technique for manufacturing molded plastic combs with enlarged, smooth terminal teeth ends that avoid discomfort that could otherwise be caused by sharp edges left over from the molding step. The technique herein is cost-effective, does not require expensive or complicated equipment, and results in terminal teeth ends that are uniform, smooth, durable, and pleasing in appearance. Other advantages will be evident to those skilled in the art.

The present invention may be embodied in other specific forms without departing from the spirit or essential attributes thereof, and it is therefore desired that the present embodiment be considered in all respects as illustrative and not restrictive, reference being made to the appended claims rather than to the foregoing Detailed Description and accompanying Drawings to define the scope of the invention.

What is claimed is:

1. A method for manufacturing an injection-molded platic hair pick, comb, or lift having teeth with enlarged, smooth, coated terminal ends, free of exposed mold-parting lines, comprising injection molding said hair pick, comb, or lift from a plastic selected from the group consisting of polypropylene, polypropionate, and polyacetate, said method further comprising the following combination of steps in the sequence set forth;
   a) oxidizing said terminal ends sufficiently to form a more adherent surface thereat without deforming said terminal ends;
   b) dipping the oxidized terminal ends into a bath of polyurethane enamel in order to coat each of said terminal ends;
   c) jolting the coated terminal ends to release any excess enamel and to facilitate formation of smooth globules effectively covering the mold-parting lines thereon; and
   d) drying the globules on the terminal ends to a glossy finish.

2. The method of claim 1 wherein said plastic is polypropylene.

3. A method for manufacturing an injection molded plastic hair pick, comb, or lift, having teeth with enlarged, smooth, coated terminal ends, free of exposed mold parting lines, comprising injection molding said hair pick, comb or lift from a plastic selected from the group consisting of polypropylene, polypropionate, and polyacetate, said method further comprising the following combination of steps in the sequence set forth:
   a) roughening said terminal ends by passing said ends near an open flame sufficiently to form a more adherent surface thereat without deforming said terminal ends;
   b) dipping the heated terminal ends into a bath of polyurethane enamel in order to coat each of said terminal ends with enamel;
   c) jolting the coated terminal ends to release any excess enamel from the teeth ends and to facilitate formation of smooth globules effectively covering the mold-parting lines thereon; and
   d) drying the globules on the terminal ends to a glossy finish.

4. The method of claim 3 wherein said plastic is polypropylene.

5. A method for manufacturing an injection-molded plastic hair pick, comb, or lift, having teeth with enlarged, smooth, coated terminal ends, free of exposed mold-parting lines, comprising injection molding said pick, comb, or lift from a plastic selected from the group consisting of polypropylene, polypropionate, and polyacetate, said method further comprising the following combination of steps in the sequence set forth:
   a) passing said terminal ends through an open flame sufficient to heat the terminal ends and provide a more adherent surface thereat without deforming the terminal ends;
   b) dipping the heated terminal ends into a first bath of polyurethane enamel in order to coat each of said terminal ends with enamel;
   c) jolting the dipped pick, comb, or lift to release any excess enamel and facilitate formation of smooth globules on the terminal ends effectively covering any mold-parting lines thereon;
   d) drying the globules on the terminal ends to a glossy finish;
   e) dipping the coated teeth ends into a second bath of polyurethane enamel, of different color from the first bath, to at least partially coat the globules thereon; and
   f) again drying the globules on the terminal ends to a glossy finish.

6. The method of claim 5 wherein said plastic is polypropylene.

7. A method for manufacturing an injection-molded plastic hair pick, comb, or lift having teeth with enlarged, smooth, coated terminal ends, free of exposed mold-parting lines, comprising injection molding said hair pick, comb, or lift from a plastic selected from the group consisting of polypropylene, polypropionate, and polyacetate, said method further comprising the following combination of steps in the sequence set forth:
   a) oxidizing said terminal ends by passing said terminal ends near an open flame sufficiently to form a more adherent surface thereat without deforming the terminal ends;
   b) dipping the oxidized teeth ends into a bath of polyurethane enamel in order to coat each of said terminal ends with enamel;
   c) passing air over the freshly dipped terminal ends to release any excess enamel from the teeth ends and facilitate the formation of smooth globules on the terminal ends effectively covering the mold-parting lines thereon; and
   d) drying the globules on the terminal ends to a glossy finish.

8. The method of claim 7 wherein said plastic is polypropylene.

9. The method of claim 7 further comprising the step of capturing the excess enamel released from the terminal ends and recirculating said captured enamel into said bath.

10. A method for manufacturing an injection molded plastic hair pick, comb, or lift having teeth with enlarged, smooth, coated terminal ends, free of exposed mold-parting lines, comprising injection molding said hair pick, comb, or lift from a plastic selected from the group consisting of polypropylene, polypropionate, and polyacetate, said method further comprising the following combination of steps in the sequence set forth;
 a) oxidizing said terminal ends sufficiently to form a more adherent surface thereat without deforming the terminal ends;
 b) dipping the oxidized teeth ends into a bath of polyurethane enamel in order to coat each of said terminal ends with enamel;
 c) blotting the freshly dipped, coated terminal ends on a porous, absorbent surface to release any excess enamel and facilitate formation of smooth globules effectively covering the mold-parting lines on said terminal ends; and
 d) drying the globules on the terminal ends to a glossy finish.

11. The method of claim 10 wherein said plastic is polypropylene.

12. The method of claim 10 further comprising the step of capturing the excess enamel released from the terminal ends and recirculating said captured enamel into said bath.